May 4, 1926.

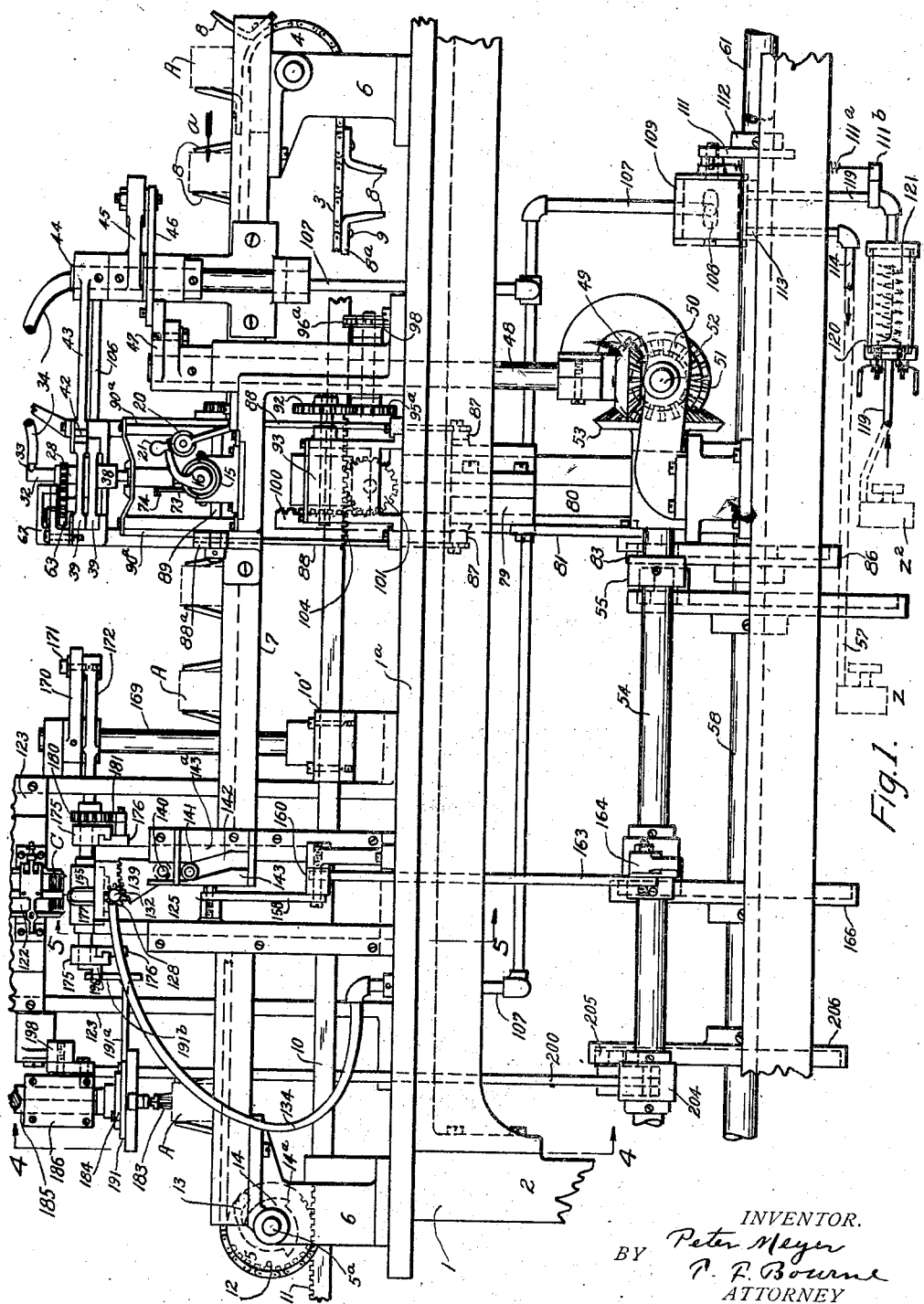

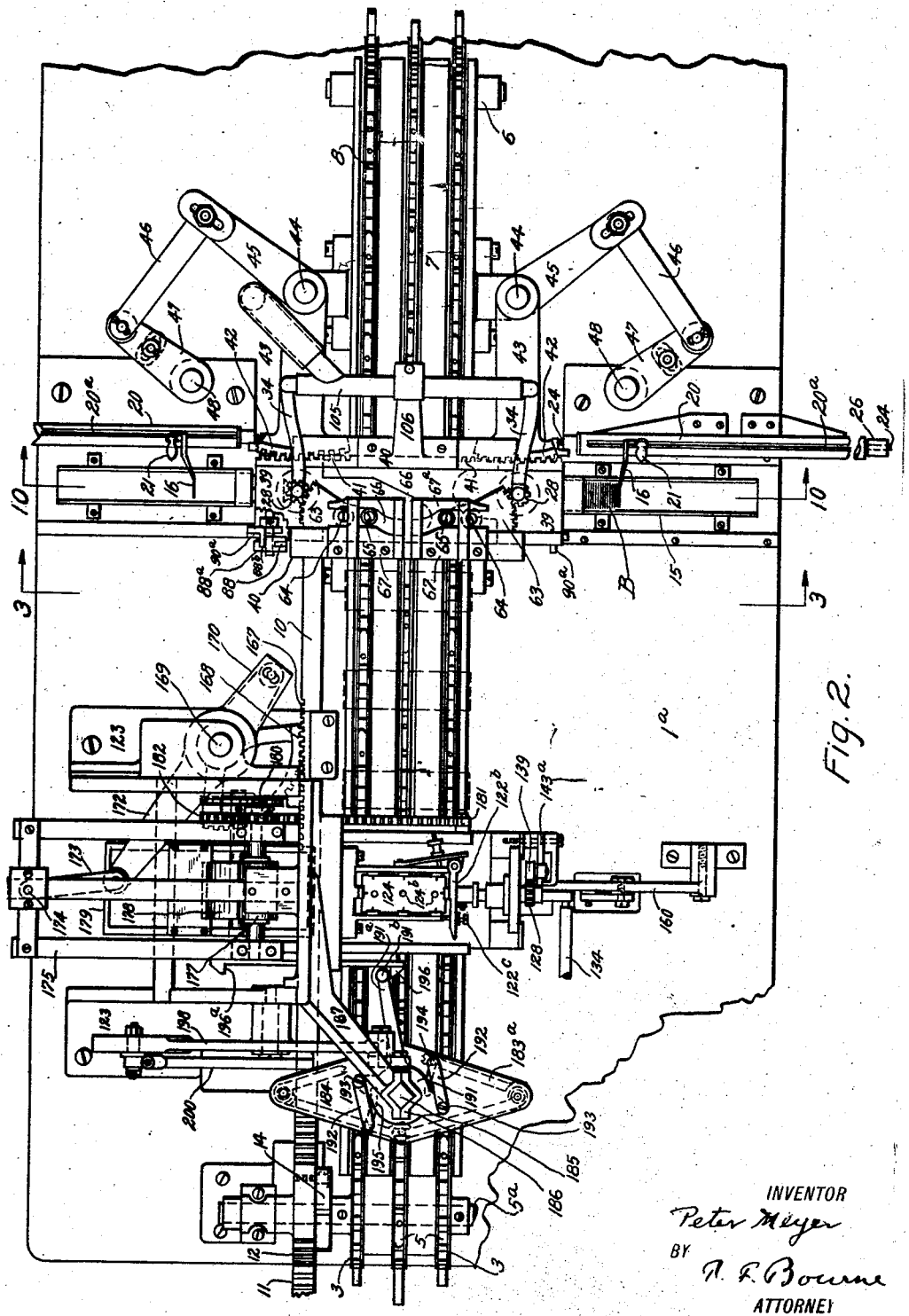

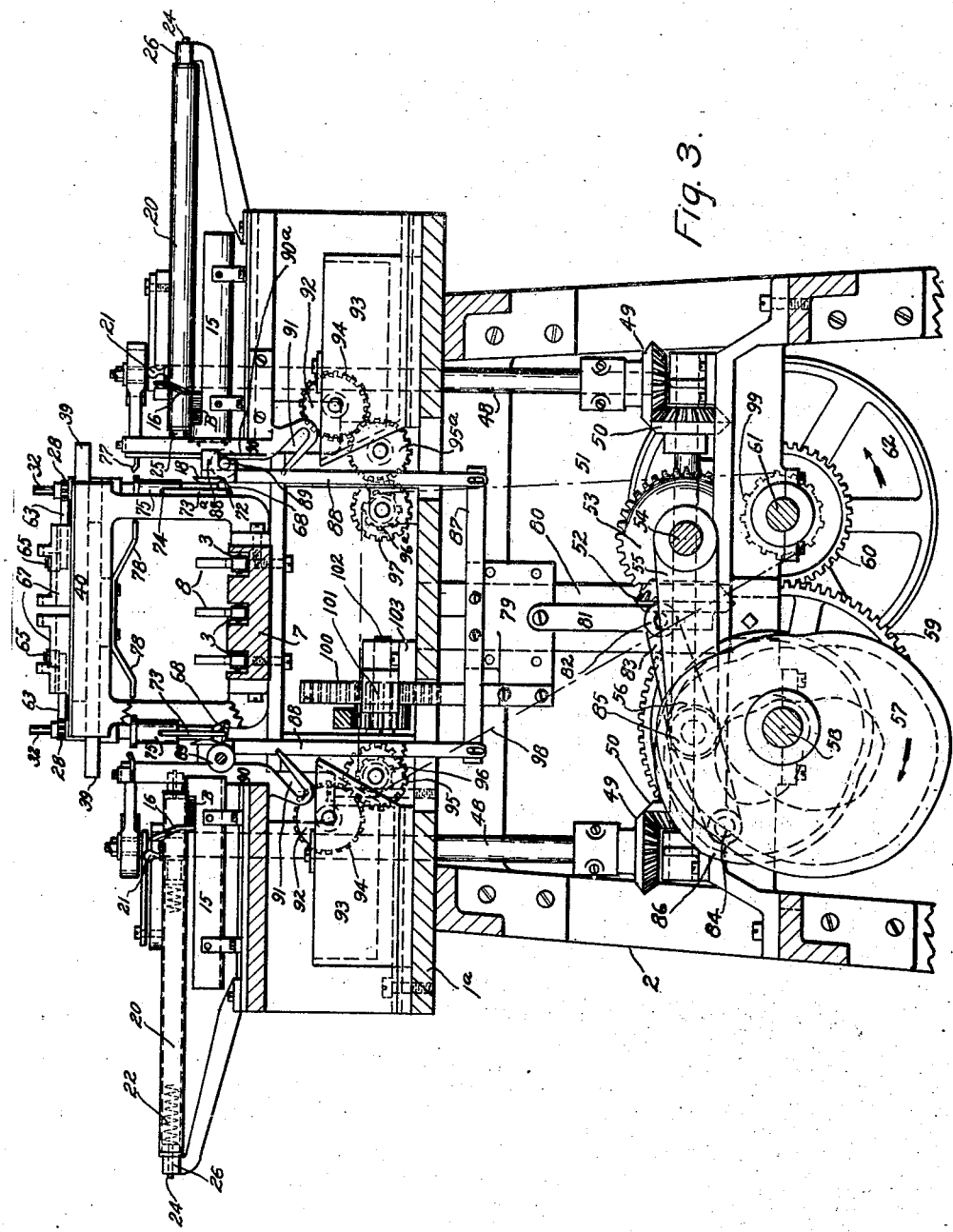

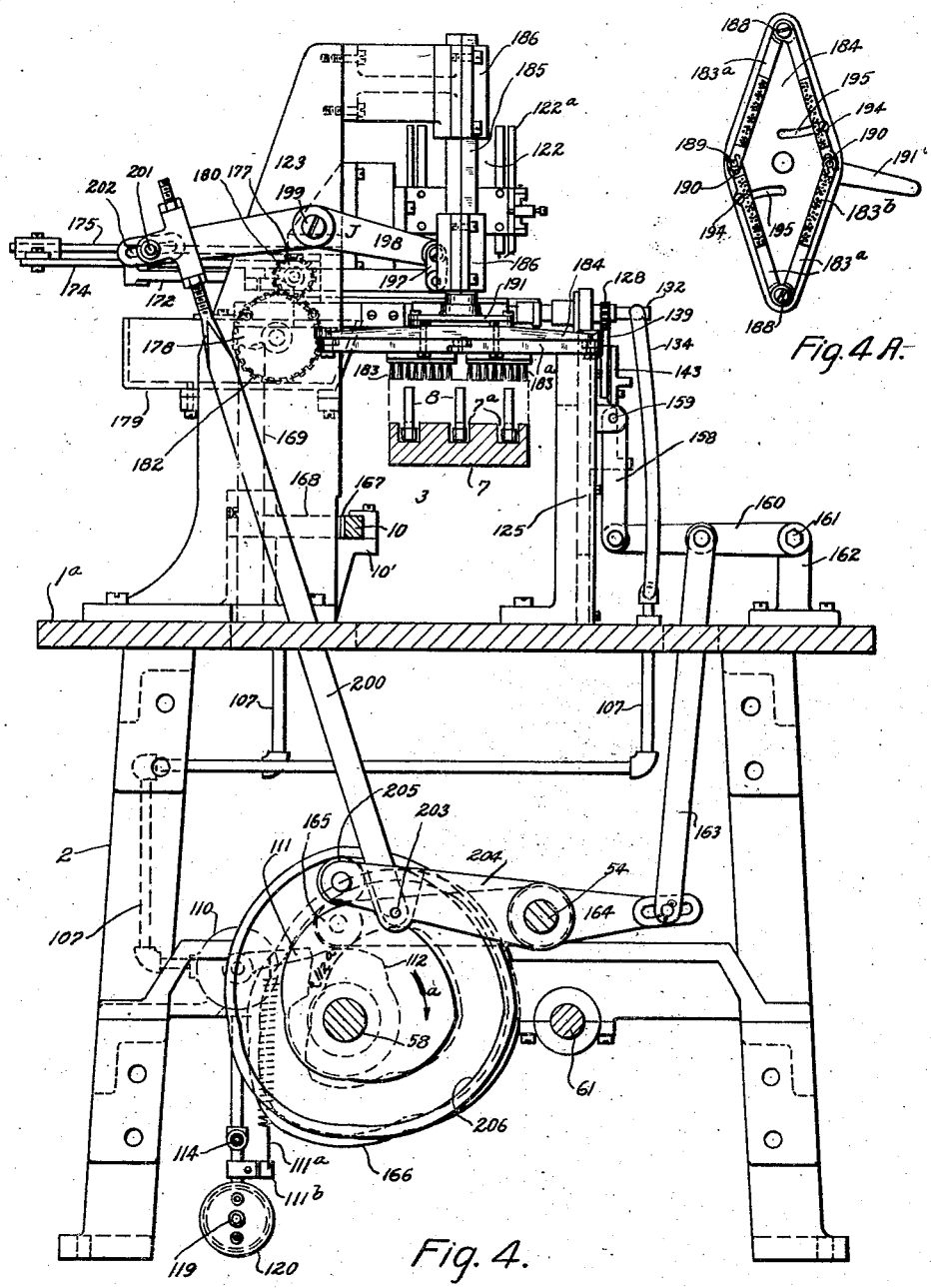

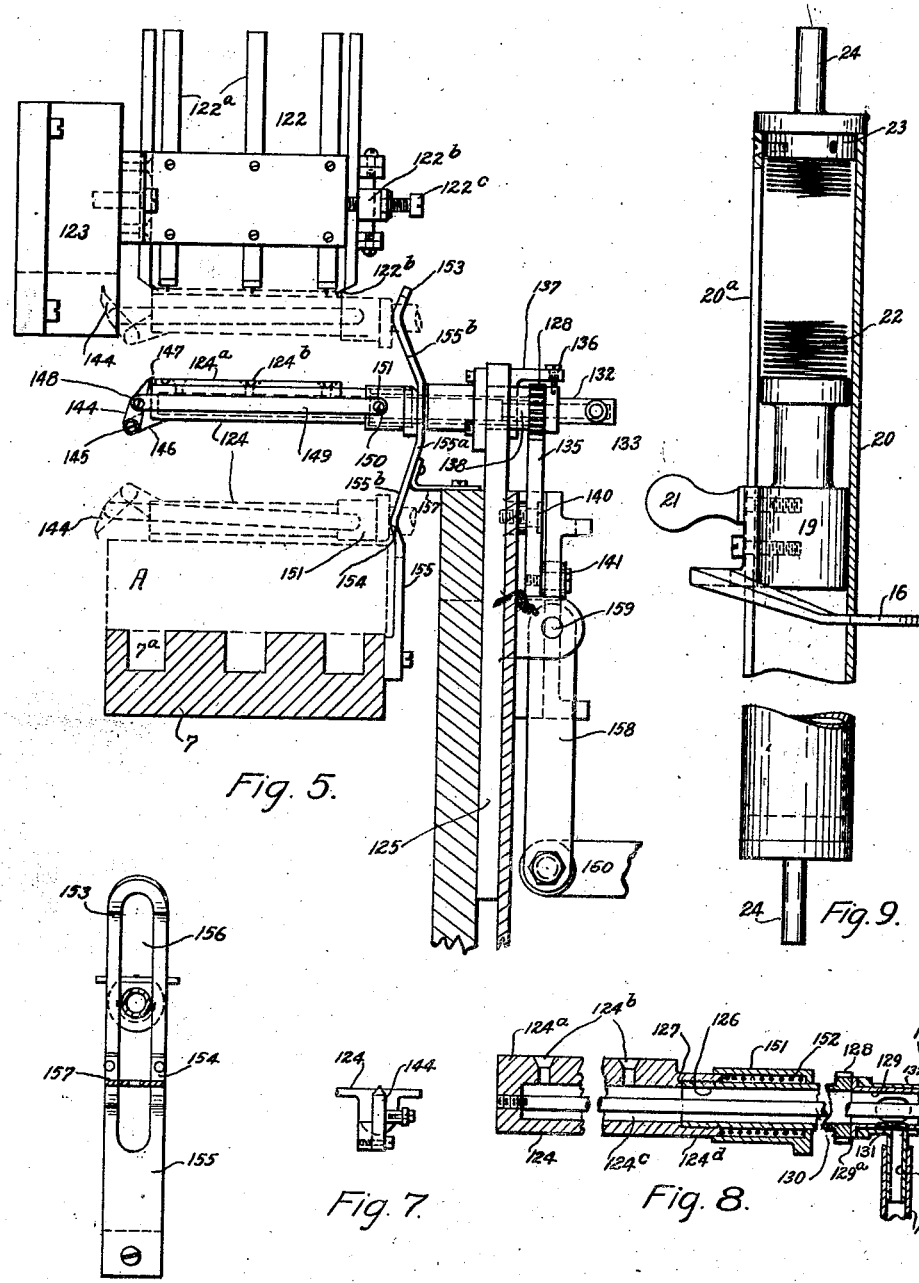

P. MEYER 1,583,411

LABELING MACHINE

Filed Sept. 18, 1924 6 Sheets-Sheet 6

INVENTOR.
Peter Meyer
BY
P. F. Bourne
ATTORNEY.

Patented May 4, 1926.

1,583,411

UNITED STATES PATENT OFFICE.

PETER MEYER, OF NEWARK, NEW JERSEY.

LABELING MACHINE.

Application filed September 18, 1924. Serial No. 738,366.

*To all whom it may concern:*

Be it known that I, PETER MEYER, a citizen of the United States, and resident of Newark, in the county of Essex and State of New Jersey, have invented certain new and useful Improvements in Labeling Machines, of which the following is a specification.

The object of my invention is to provide a simple and efficient means for automatically applying labels to packages, such as cartons, boxes, bottles and the like, and for discharging the same automatically and expeditiously.

My invention also comprises novel details of improvement that will be more fully hereinafter set forth and then pointed out in the claims.

Reference is to be had to the accompanying drawings, forming a part hereof, wherein—

Fig. 1 is a side elevation illustrating a machine embodying my invention;

Fig. 2 is a plan view of the machine;

Fig. 3 is a cross section substantially on line 3, 3, in Fig. 2;

Fig. 4 is a cross section substantially on line 4, 4, in Fig. 1;

Figure 10:
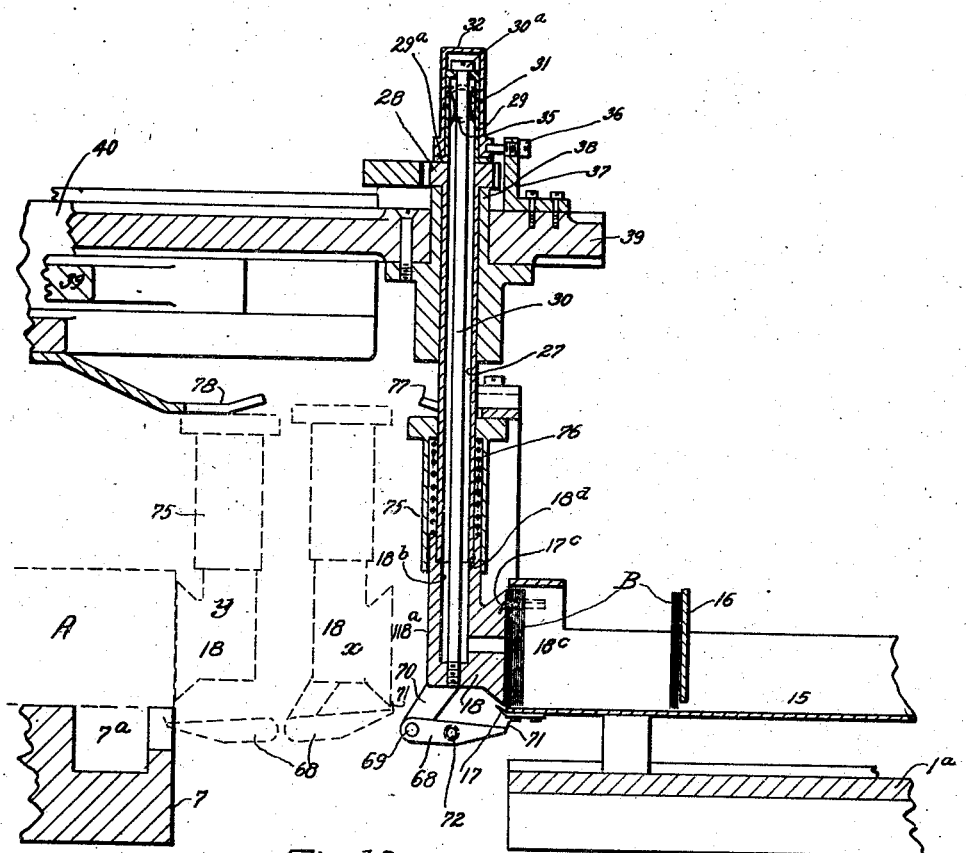
Figure 11:
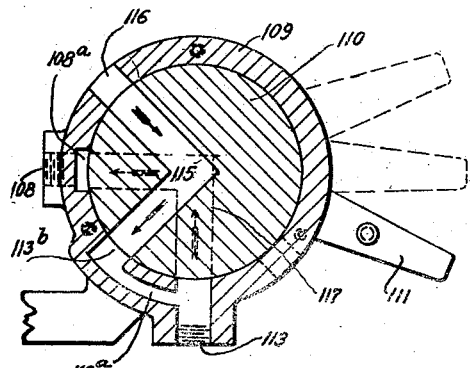
Figure 12:
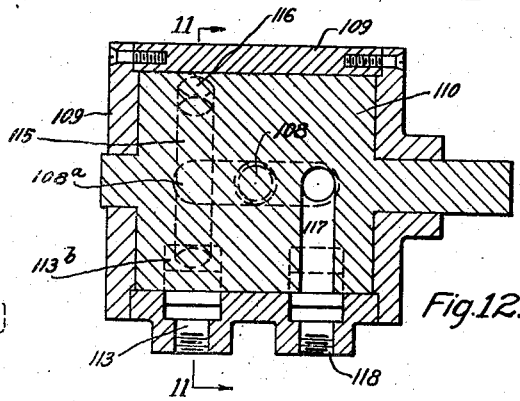

Fig. 4$^a$ is a detail of the adhesive spreading brush;

Fig. 5 is an enlarged cross section substantially on the plane of line 5, 5, in Fig. 1;

Fig. 6 is a detail of bar 155;

Fig. 7 is a detail end view of head 124;

Fig. 8 is a sectional detail of head 124;

Fig. 9 is an enlarged sectional detail of label feeding means;

Fig. 10 is an enlarged detail section on the plane of line 10, 10, in Fig. 2;

Fig. 11 is a cross section on line 11, 11, in Fig. 12 through the air-controlling valve, and Fig. 12 is a cross section through Fig. 11.

Similar numerals and letters of reference indicate corresponding parts in the several views.

In the drawings the numeral 1 indicates the main frame of the machine shown provided with a table-like portion or top 1$^a$ supported by legs 2, in any suitable way. The machine is provided with an endless conveyor for the packages, cartons or the like, A, which conveyor is shown comprising a plurality of spaced chains 3 mounted upon sprocket wheels 4, 5, supported by shafts in bearings upon uprights or brackets 6 upon table top 1$^a$. The upper runs of the chains are guided in grooves 7$^a$ in guide member 7 longitudinally disposed and shown supported by the bracket 6, (Fig. 1), whereby the upper runs of the chains are supported as they travel through the machine, (Fig. 3). The conveyor is provided with receivers for the containers A, shown in the form of spaced projections 8 arranged in pairs, the inner portions 8$^a$ of said projections 8 bearing against the corresponding chain and being riveted thereto, as to the blocks between the links at 9, (Fig. 1). The arrangement is such that as the conveyor chains travel in the direction of the arrow $a$ in Fig. 1, from the receiving end of the machine, over the sprocket wheels 4, the projections 8 of a pair will be spread apart to conveniently receive the container A therebetween, and as the conveyor continues to travel and the upper runs of the chains straighten out the corresponding projections 8 will move into snug engagement with the container. The conveyor is operated step-by-step and may be accomplished in any desired way. I have shown a reciprocative bar 10 guided to slide in suitable bearings 10' on the machine, (Fig. 4), which bar may be actuated to and fro by means hereinafter described, the bar 10 being provided with rack teeth at 11 engaging a gear 12 secured on shaft 5$^a$ of sprocket wheels 5, (Figs. 1 and 2). The gear 12 is provided with a dog 13 adapted to engage a wheel or disk 14 having several spaced teeth 14$^a$, whereby when bar 10 is reciprocated the gear 12 will be rotated back and forth and its dog 13 will successively engage the teeth 14$^a$ for rotating shaft 5$^a$ and the sprocket wheels 5 for feeding the conveyor chains step-by-step, (Fig. 1).

The machine I have illustrated is adapted to paste labels B against opposite ends or sides of containers A simultaneously and successively, although it will be understood that such labels may be pasted on a single end or side of the containers as desired, (Figs. 2 and 3). The machine is also adapted to paste labels C successively against sides of the containers, (Fig. 1). Since the means for pasting the labels B against opposite ends or sides of the containers are the same on opposite sides of the conveyor a description of the details of one set of label feeding and applying devices will be applicable to both sets in conjunction with means provided for actuating both sets of such devices substantially simultaneously.

A chute or trough 15 is suitably mounted on table top 1ª and is shown provided with open ends and an open top, the chute or trough having its inner end located substantially in horizontal alignment with the adjacent end of a container A on the conveyor, (Figs. 1, 3 and 10). The labels B are stacked on edge in the chute 15 and are normally pressed toward the inner or delivery end of the chute by means of a finger or pusher 16, the inner or endmost label being normally stopped against spaced projections or prongs 17, shown secured to the chute, (Figs. 3 and 10). The projections or prongs 17 have inclined faces located at an acute angle inwardly disposed respecting the longitudinal axis of chute 15 so as to obstruct the stack of labels and yet permit the endmost label to be withdrawn as required, the edges of the labels slipping along the inclined faces of the projections when withdrawn from the stack by means of a transferring head 18 through which air is induced at the proper time to cause the endmost label to adhere to such head, and which exhaust of air through the head is stopped when required to release the label. The finger 16 projects into the top opening of the chute 15 from a plunger 19 slidable in a guiding tube or casing 20 supported on the main frame, (Figs. 2, 3 and 9), the tube 20 being shown provided with a longitudinal slot 20ª through which the inner end of finger 16 as well as a handle on finger piece 21 project from the plunger 19. Within the tube or casing 20 is a coil spring 22 bearing at one end against plunger 19 and at the other end against a head 23 at one end of the tube, whereby the plunger is normally pressed in such a direction that the finger 16 will normally bear against the stack of labels B. The tube or casing 20 is shown provided with pivots 24 at opposite ends which are journaled in bearings at 25, 26, whereby said tube may be rocked. When a stack of labels B is placed in the chute 15 the finger 16 is first drawn from the chute as by rotating the tube 20 and pushing the plunger outwardly against the tension of spring 22, and after the labels have been placed in the chute the finger is restored behind the labels so that the spring maintains a normal pressure against the stack of labels forcing them against the projections 17 with the desired pressure. An advantage of the construction described is that the operator may place the labels in the chute without stopping the progress of the machine since the labels in the chute may be kept pressed manually toward the projections 17 while another stack of labels is being placed in the chute behind the other ones. The exhaust label-transferring head 18 is to be moved back and forth between the end of the stack of labels in the chute 15 and the end or side of a container A on the conveyor to receive and apply labels, and during such time the head 18 is rotated from label receiving to label applying position and reversely by means arranged as follows.

The head comprises a member 18ª, (Figs. 8 and 10), having a longitudinal bore 18ᵇ and a port 18ᶜ opening through the label receiving face of the head, a tube 27 entering the bore 18ᵇ and resting at its inner end against the shoulder 18ᵇ therein to make a tight fit, the upper end of which tube is provided with a gear 28 upon which rests the laterally disposed flange or extension 29ª of a hollow cap 29, the head 30ª of a threaded rod 30 bearing against the outer end of said cap and extending through the bores of said cap, tube 27 and bore 18, the lower threaded end of said rod being screwed into a threaded hole in head 18, whereby the parts are secured air tight together to rotate. The cap 29 is provided with one or more openings 31 for air. Outside of cap 29 is a hollow hood 32 whose lower enlarged end rests upon the flange 29ª of cap 29 and said hood is provided with a nipple 33 to which an air hose 34 is attached, said nipple communicating through an opening 35 in the hood with the opening 31 in cap 29, whereby the air is induced through port 18ᶜ into head 18 and thence through opening 31 to hose 34. When the head rests against the endmost label in the corresponding chute 15 the label will be retained against the head by reason of the exhaust therein. A pin 36 carried by a support 37 enters an opening in hood 32 to retain the latter in proper position. When the aforesaid exhaust occurs the flange 29ª will be drawn tightly against the top of gear 28 to maintain a tight fit and prevent the loss of air, while at the same time the cap 29 may rotate with gear 28 within hood 32. The gear 28 is supported by a bearing 38 carried by a slide member 39, which bearing also serves as a bearing for tube 27, and since gear 28 rests upon bearing 38 the exhaust head 18 is pivotally supported. The slide 39 is mounted to reciprocate in guideways 40 mounted upon the main frame transversely over the conveyor and said slide is provided with a rack 41 in engagement with an arcuate gear 42 on an arm 43 secured on vertical shaft 44 journaled in suitable bearings on the main frame, (Fig. 2). Since two slides 39 are shown, each having a rack 41, there are also two corresponding racks 42, arms 43 and shafts 44, respectively located on opposite sides of the conveyor. The shaft 44 has a corresponding arm 45 connected by link 46 with a corresponding arm 47 secured on shaft 48 journaled in suitable bearings on the main frame, (Figs. 1 and 2).

Each shaft 48 is shown provided with a beveled gear 49 in mesh with a corresponding gear 50 secured on shaft 51 journaled in bearings on the main frame, (Figs. 1 and 3), which shaft is shown provided with a gear 52 in mesh with a gear 53 secured on a shaft 54 journaled on the main frame. Shaft 54 is rocked by means of an arm 55 secured thereon and having a projection or roller 56 cooperative with a cam 57 secured on shaft 58 journaled on the main frame, (Figs. 1 and 3). Shaft 58 is shown provided with a gear 59 in mesh with a gear 60 on shaft 61 journaled on the main frame and shown provided with a drive pulley 62 which may be operated by a belt from a suitable source of power or in any other desired way, (Fig. 3). When shaft 54 is rocked the shafts 44 will be correspondingly rocked through the gears and arms before described for reciprocating the slide members 39. A segmental gear 63 is pivotally supported on the corresponding slide member 39 at 64 and in mesh with the corresponding gear or pinion 28, (Fig. 2). The segmental gear 63, on the side of pivot 64 opposite its teeth, carries a projection or roller 65 operative in a cam-like groove 66 provided between members 67, 67a. When the parts are in the positions shown in Figs. 2 and 10 the exhaust head 18 will be in position with its port 18a pressed against the labels B, (Fig. 10), and the segmental gear 63 will be in the positions shown in Fig. 2, and when the slide members 39 are moved inwardly respecting the conveyor the projections 65, by operating in the straight portions of slots 66, will move the heads 18 and the labels thereon from chutes 15, and the heads will come to rest for application of adhesive to said labels at the dotted line position x in Fig. 10, and then as the projections 65 operate in the curved portions of the corresponding cam slots 66, they will cause the segmental gears 63 to rock to actuate the gears or pinions 28 for rotating the corresponding head 18 from the adhesive applying position at x in Fig. 10, to the label delivery position shown in dotted lines y at the left hand side of Fig. 10, during the travel of slide 39 which transfers the head 18 from the label receiving to the label delivery position. When the slide 39 returns on the corresponding stroke the head 18 will be returned to label receiving position at the end of chute 15, during which time the segmental gears 63 will rotate the head 18 reversely from the label delivering to the label receiving position. By the means described for each to and fro reciprocation of a slide member 39 a label will be attached to a head 18, paste will be applied on the label and the latter will be delivered against a side or end of a container A, and the head 18 will be returned to label receiving position, such movements of the head 18 occurring during the step-by-step movements of the conveyor, the parts being so timed that when a conveyor comes to rest with a container A in position to receive a label the head 18 will be presented against the adjacent end or side of the container, and so on successively as the containers are fed.

In order to aid in mechanically retaining the labels on the head 18 as they are transferred from label receiving to label delivering positions, and while adhesive is being applied to the labels, I provide grippers 68, (Figs. 1, 3 and 10), which are pivotally supported at 69 upon brackets 70 carried by head 18, which grippers are shown provided with projecting tongues 71 adapted to engage the adjacent edge of a label and retain it against the side of head 18. The gripper 68 is pivotally connected at 72 with a link 73 that is pivotally connected at 74 with a sleeve 75 that is mounted to slide on an end of the extended part 18a of member 18 and on tube 27, (Figs. 8 and 10). A coil spring 76 within sleeve 75 bears at one end against the sleeve and at the other end against the part 18a normally tending to press the sleeve upwardly and thereby through link 73 to actuate gripper 68 so that its tongue 71 will engage a label against the face of head 18. At the label receiving position the outer end of sleeve 75 is adapted to engage a cam-like stop 77, and at the label delivering position the said end of sleeve 75 is adapted to engage a cam-like stop 78, which stops are in position to depress sleeve 75 and thereby through link 73 to cause gripper 68 to be depressed out of the path of the labels and chute 15. When head 18 moves away from chute 15 the sleeve 75 will pass from stop 78 and thereby said sleeve will rise and cause gripper 68 to engage and retain a label at the face of head 18, and when said head has been moved toward the conveyor a proper distance the sleeve 75 will engage stop 78 and will be depressed to cause gripper 68 to release the label adjacent to the container A. During the progress of the label with head 18 from label receiving to label delivering positions the gripper 68 will serve to keep the label from being displaced from the head notwithstanding the exhaust operating against the label within the head.

During the time the head 18 with a label thereon is being transferred from the label receiving to the label applying position adhesive is applied to the face of the label that is to be applied against a container. For such purpose I provide the following arrangement:—a reciprocative head 79, (Fig. 3), is guided along an upright 80 on the main frame and is shown provided with a depending link 81 pivotally connected at 82 with an arm 83 pivotally supported on the frame at 84 and provided with a projection or roller 85 cooperative with a cam 86 secured on shaft 58 for reciprocating head 79. The head 79 on opposite sides is provided with arms 87 to which rods or bars 88 are pivotally connected and extend upwardly in pairs. Between the upper ends of each pair of rods 88 rollers 89 are journaled and are reciprocative laterally in position between the corresponding chute 15 and label transferring head 18 to apply adhesive, such as paste or glue, to the exposed surface of the label on head 18. The shafts of rollers 89 are carried by blocks or heads 88ª supported by rods 88, said heads having recesses 88ᵇ that receive lateral guides or webs 90ª that project from upright guides 90 carried by the main frame. The guides 90 are provided at the lower ends with downwardly and outwardly inclined slots 91 to receive the shafts of the rollers 89 and guide them laterally so that the surfaces of the rollers will be presented to adhesive distributing rollers 92 journaled on and operative in tanks 93 for the adhesive, (Fig. 3). The shafts of the rollers 93 are provided with gears 94 in mesh with gears 95, 95ª respectively. The shaft of gear 95 is shown provided with a sprocket wheel 96, and gear 95ª is shown in mesh with a gear 97 whose shaft is provided with a sprocket wheel 96ª. An endless chain 98 passing over the sprockets 96, 96ª and over sprocket 99 on shaft 61 serves to rotate the adhesive distributing rolls 92 continuously. When the rollers 89 are depressed and their shafts enter the slots 91 the rollers will be guided into contact with the distributing rolls 92 to receive adhesive therefrom, and when the rollers 89 are raised they will pass into engagement with the label that is on the corresponding head 18 that will have been brought to rest at a distance from the adjacent chute 15, as at the position of head 18 indicated in dotted lines at $x$ in Fig. 10, to apply adhesive to the label. In such position of the parts the grippers 68 retain the labels against heads 18 to prevent the labels from being rolled away from the heads when the rollers 89 apply adhesive to the labels. The head 18 will continue toward container A to apply the label thereto and roller 89 will be depressed, and so on successively. The head 79 is shown provided with an upwardly extending rack 100 in mesh with a gear 101 whose shaft 102 is journaled on a bearing 103 on table top 1ª, the gear 101 being in mesh with a rack 104 on rod 10, whereby as the head 79 is reciprocated the rod 10 will be reciprocated step-by-step for correspondingly operating the conveyor.

Means for producing exhaust in and releasing the exhaust from the label transferring head 18, and also for blowing heated air against the label when it has been applied to a container, are arranged as follows:—the hose 34 communicates with a tube or manifold 105 shown supported by an arm 106, (Fig. 2), and in communication with a pipe 107 that communicates with an air inlet or suction port 108 in a valve casing 109 supported in the main frame, (Figs. 1, 11 and 12). Within said casing 109 is a rotative valve 110 adapted to be rocked and provided with an arm 111 actuated by cam 112 on shaft 58. A spring 111ª connected with arm 111 and with a stop 111ᵇ causes the said arm to cooperate with cam 112. The casing 109 is provided with an air outlet port 113 connected by tube 114 with any suitable exhaust apparatus (indicated at $z$ in Fig. 1), for inducing suction through pipe 107 and thence through hose 34 in the corresponding label transferring head 18. Port 108 communicates with a transverse channel 108ª shown in a wall of casing 109, (Figs. 11 and 12), and said casing has a channel 113ª communicating with port 113 and with a port 113ᵇ opening within the casing. The valve 110 is provided with an angularly disposed channel 115 adapted to communicate simultaneously with port 113ᵇ and an air inlet relief port 116 in casing 109, when the valve is in one position, (Fig. 11), and to communicate with port 108ª and port 113 when the valve is in another position. When a label is to be attached to the label transferring head 18, with the latter bearing against the endmost label of a stack B, the valve 110 will be in the last named position and exhaust induced through tube 114, (through port 108), will cause exhaust in said head 18 to cause the label to adhere to the head. When the head 18 has moved to the label delivering position the valve 110 will be rocked to the position shown in Fig. 11, so that exhaust through port 108 will be cut off and at such time channel 115, by communicating with ports 113ᵇ and 116, will permit air to flow to the suction apparatus so that the label will be released from head 18 against the adjacent end or side of a container A. When head 18 is in the last named position and the label has been released, with valve 110 in the position shown in Fig. 11, a channel 117, shown angularly disposed within valve 110 and spaced from channel 115, will communicate at one end with channel 108ª, (to supply heated air to port 108), and with a port 118 in casing 109, (Fig. 12), that communicates with a pipe 119 leading to a pressure apparatus or blower of any suitable character, indicated at $z^2$ in Fig. 1. The pipe 119 leads through an air heating device 120 of any suitable character, (Figs. 1 and 4), shown comprising a casing containing an electric heating coil 121 of any suitable construction. When the label applying head is in the label delivering position, as last stated, and valve 110 is in the position with channel 117 communicating with ports 108 and 118 heated air will be blown through the port 108 to force the label against the container A to spread it thereon and heat the same and the adhesive to assist in causing the same to quickly dry. As indicated in dotted lines in Fig. 4, the cam 112 has a drop-portion at 112ª so arranged that when the cam rotates in the direction of the arrow b in Fig. 4 the arm 111 will drop off of the high part of the cam suddenly so that a blast of hot air will be blown against the label, and during the remainder of a rotation of said cam the arm 111 will be actuated to shift the position of valve 110 in proper timing so that exhaust through head 18 will be started after the head has engaged a label in the stack B and maintained until the label has been presented against the end or side of a container, and so on for each rotation of said cam.

The parts of the machine so far described may be used for applying a label or labels upon the containers at one or both ends or sides of the same without reference to applying another label on such container. In the example illustrated I provide means for applying a label on the side of the container other than those previously specified, arranged as follows:—Over a suitable stopping point of the conveyor, spaced from the labeling devices previously described, is located a magazine 122 suitably supported from bracket 123 on table top 1ª located in position over a label transferrer head 124, which is rotatively supported upon a slide member 125 adapted to move said transferrer from label receiving position beneath magazine 122 to label delivering position upon container A, (Figs. 1, 2 and 5). The magazine is shown comprising spaced vertically disposed bars 122ª having inwardly projecting and downwardly inclined prongs 122ᵇ that support the stack of labels C flatwise so that the lowermost label may readily be pulled from beneath the stack. One side of the magazine 122ᵇ is shown hinged and may be retained closed by means of the screw 122ᶜ, (Figs. 2 and 5), whereby the labels C may be readily placed in the magazine. The face 124ª of transferrer head 124 is adapted to be placed against the endmost label in magazine 122, and one or more ports 124ᵇ communicate through said face with a bore 124ᶜ within said head through which air is induced at the proper time to cause the endmost label to adhere to such head, which exhaust of air through the head is stopped when required to release the label. The head 124 and its operating parts are arranged substantially the same as described with respect to head 18, and as illustrated in Figs. 5 and 8 the parts are arranged as follows:—A tube 126 enters bore 124 and rests at its inner end against a shoulder 127 to make a tight fit, the outer end of which tube is provided with a gear 128 against which rests a laterally disposed flange or extension 129ª of a hollow cap 129, the head 130ª of a threaded rod 130 bearing against the outer end of said cap and extending through the bores of said cap, the tube 126, and bore 124ᶜ, the inner threaded end of said rod being screwed into a threaded hole in head 124, whereby the parts are secured air tight together to rotate. The cap 129 is provided with one or more openings 131 for air. Outside of cap 129 is a hollow hood 132 whose inner or large end rests upon the flange 129ª of cap 129 and said hood is provided with a nipple 133 to which an air hose 134 is attached, said nipple communicating through an opening in the hood with the opening 131 in cap 129, whereby air is induced through ports 124ᵇ into head 124 and thence through opening 131 to hose 134 which is connected to piping 107 of the exhaust system. When the head 124 rests against the endmost label in magazine 122 the label will be retained against the head by reason of the exhaust therein. A pin 136 carried by a support 137 enters an opening in hood 132 to retain the latter in proper position. When the exhaust occurs the flange 129ª will be drawn tightly against the top of gear 128 to maintain a tight fit and prevent the loss of air, while at the same time the cap may rotate with the gear within hood 132. The tube 126 is journaled in a bearing 138 carried by slide 125, whereby transferrer head 124 is pivotally supported. A segmental rack 139 is pivotally supported at 140 upon slide member 125 and in mesh with gear or pinion 128, (Figs. 1 and 5). The segmental gear 139 on the side of pivot 140 opposite its teeth carries a projection or roller 141 operative in a cam-like groove 142 provided between members 143, 143ª carried by table top 1ª. When head 124 is raised so that its face 124ª will be pressed against the lowermost label in the magazine 122 the projection 141 will be in the upper straight portion of cam-slot 142, and during the descent of member 124 paste will be applied to its label and the projection 141 will engage the inclined portion of said slot to cause the segmental gear 139 to operate gear 128 to rotate the head 124 from label receiving to label delivering position, (see dotted lines in Fig. 5), the reverse operation occurring when said slide is moved upwardly, and so on for each label to be pasted.

In order to aid in mechanically retaining the labels on the head 124 as they are transferred from label receiving to label delivering positions, as when paste is being applied on the labels, I provide a gripper 144, (Figs. 5 and 7), which is pivotally supported at 145 upon bracket 146 carried by head 124, which gripper is shown provided with projecting tongue 147 adapted to engage the adjacent edge of a label and retain it against the surface 124ª of head 124. The gripper 144 is pivotally connected at 148 with a link 149 that is pivotally connected at 150 with a sleeve 151 that is mounted to slide on an end of the extended part 124ᵈ of head 124 and on tube 126, (Fig. 8). A coil spring 152 within sleeve 151 bears at one end against the sleeve and at the other end against the part 124ᵈ, tending to press the sleeve outwardly and thereby through the link 149 to gripper 144 so that its tongue 147 will engage a label. At the label receiving position the outer end of sleeve 151 is adapted to engage a cam-like stop 153, and at the label delivering position said end of sleeve 151 is adapted to engage a cam-like stop 154, which stops are in position to push sleeve 151 and thereby through link 149 to cause gripper 144 to be moved out of the path of the labels. The stops 153 and 154 are shown provided on a bar 155, which, between said stops, is bent laterally at 155ª, which bar is provided with a longitudinal slot 156 in which the tube 126 slides, the bar 155 being supported by an arm 157, (Figs. 5 and 6). The part 155ª is at one side of the plane of stops 153, 154 and the bar is inclined laterally at 155ᵇ between the stops 153, 154 and the part 155ª, so that the sleeve 151, by means of spring 152, will be pushed along tube 126 when the head 124 is in position between the magazine 122 and the container A upon the conveyor to cause gripping of the label on said head by the gripper 144 and tongue 147 while the label is being transferred from the magazine to the container, so that when the label has been deposited upon the container the stop 154 will have pushed sleeve 151 to cause release of gripper 144 and tongue 147 from the label as indicated in dotted lines in Fig. 5. The slide 125 may be reciprocated in timed relation to the step-by-step travel of the conveyor, means for such purpose being arranged as follows:— A link 158 is pivotally connected with the slide 125 at 159 and its lower portion is pivotally connected with a rock arm 160 shown pivoted at 161 on a support 162 carried by table top 1ª, (Fig. 4), the arm 160 being pivotally connected with a depending link 163. Said link is pivotally connected with a rock arm 164 journaled upon shaft 54 and shown provided with a projection 165 cooperative with a cam 166 secured on shaft 58, whereby for each rotation of said cam the slide 125 will be reciprocated so as to present the label receiving surface 124ª of head 124 to the lowermost label in the stack in magazine 122, whereupon exhaust induced through said head will cause a label to adhere thereto, and upon the descent of the slide the head will be lowered and rotate one-half turn to present the label over a container then at rest below said head on the conveyor and apply the label thereto, whereupon exhaust is cut off, and so on successively for each container. When the label has been applied a blast of hot air will be projected from head 124 through its ports 124ᵇ against the label, the heat drying the same, in manner described with respect to labels B, the operation of valve 110 controlling the exhaust through head 124 and the blowing of heated air through said head in timed relation to the same operations respecting labels B at head 18.

Before a label is applied upon container A adhesive is applied to the label as follows:—Upon bar 10 is a rack 167 in mesh with a segmental gear 168 carried by upright shaft 169 journaled in bearings supported upon table top 1ª, (Figs. 1, 2 and 4), which shaft is provided with a corresponding arm 170 pivotally connected at 171 with a rock arm 172 that is pivotally connected with a link 173. The arm 172 is rotative on shaft 169. Link 173 is pivotally connected at 174 with a slidable frame 175 that is guided to reciprocate along ways 176 supported by framing 123. Upon the frame 175 is journaled an adhesive applying roller 177, (Fig. 2), adapted, when reciprocated by frame 175, to engage a supply roller 178 and to engage the surface of a label upon the head 124 when the latter is temporarily at rest in the full line position shown in Fig. 5, before the label is placed upon a container below said head. The supply roller 178 is journaled in a tank 179 supported upon table top 1ª by framing 123. The shaft of roller 177 is provided with a pinion 180 in mesh with a rack 181 carried by the guide 176, whereby roller 177 will be rotated as it is reciprocated. When said roller engages the adhesive supplying roll 178 the gear 180 will engage a gear 182 connected with the shaft of roller 178 and thereby rotate the latter to supply adhesive to roll 177. When paste has been applied to the upper surface of a label on head 124 the latter will descend and rotate to present the pasted label upon the container A beneath, as in the dotted line position in Fig. 5, the gripper 144 releasing the label. The roll 177 will retreat. When the head 124 next rises it will be rotated to present its surface 124ª to the lowermost label C, and so on successively.

I provide means to sweep over a label placed upon a container A to cause its more perfect adherence thereto after having been placed thereon by the label applying head 124. For such purpose I provide a brush 183 carried by a reciprocative head 184 shown provided with an angularly disposed stem or rod 185 extending upwardly and slidable in guides 186 carried by the frame 123, as upon arm 187 extended therefrom, The brush illustrated comprises a plurality of members 183ª provided with bristles at 183ᵇ, said members being shown arranged in pairs and each pair pivotally connected with the corresponding end portion of head 184 at 188, (Fig. 4ª). The adjacent ends of the members 183ª of each pair are movably connected together so that they may assume a substantially parallel position, as indicated in Fig. 1, or may assume a spread position, (shown in diamond-like form), as illustrated in Figs. 2 and 4ª. For such purpose the inner end of one member 183ª is provided with a pin 189 operative in a slot 190 in the adjacent member. On the upper side of head 184 a member or disk 191 is rotative around the axis of stem 185 and links 192 are pivotally connected at 193 with member 191, eccentrically with respect to the axis of said member, which links are provided with pins or the like 194 that extend through arcuate slots 195 in head 184 and are connected to a member 183 of each pair of said members for actuating the latter, (Fig. 4ª). An arm 191ª extends from member or disk 191 and is provided with an upwardly extending projection 191ᵇ adapted to engage spaced stops 196, 196ª supported by frame 175, (Fig. 2). When a labeled container comes to rest beneath the brush the members 183ª will be close together and the brush will descend to engage the label, as in Fig. 1. When the roll 177 moves from the paste applying position the stop 196 will engage arm 191ᵇ and rotate the member or disk 194 in such a manner that the links 192 will cause the brush members 183ª to spread, as indicated in Fig. 2, and when the frame 175 advances, (for causing the roll 177 to apply adhesive to a container beneath magazine 122), the stop 196ª will engage projection 191ᵇ and cause the member or disk 191 to rotate reversely, whereby the brush members will be moved together in substantially parallel alignment, and so on each time for a container with a label C thereon. The head 184 is reciprocated above the containers in timed relation to the stopping of the same with the conveyor step-by-step. For such purpose a link 197 is pivotally connected with a rock arm 198 that is pivotally supported at 199 on frame or bracket 123. A link 200 is pivotally and slidably connected with arm 198 by a pin and slot connection 201, 202, (Fig. 4), said link depending through an opening in table top 1ª and being pivotally connected at 203 with an arm 204 hung loosely upon shaft 54, the free end of which arm is provided with a projection or roller at 205 and reciprocative by a cam 206 secured on shaft 58, (Figs. 1 and 4). Each time that cam 206 rotates once the arm 198 will be rocked to reciprocate the head 185 up and down in such timed relation to the placing of a container A beneath said head and to the reciprocations of the stops 196, 196ª that just after stop 196ª has engaged projection 191ᵇ and caused member or disk 192 to move the brushes 183 together, (Fig. 1), the head 184 will descend to press the brushes upon the label on container A, and upon the return of said stops the stop 196 will engage projection 191ᵇ to rock the member or disk 192 reversely to cause the brushes to spread and thereby sweep angularly upon the label upon the container, whereupon the head 184 will rise from the container, and so on for each label and container. The sweeping of the brushes as described along the outer surface of the label on the container will have the effect to smooth the label and cause it to adhere in a desired way to the container to avoid wrinkles in the label, much after the manner of smoothing labels by hand operation.

Having now described my invention what I claim is:

1. A labeling machine comprising means to supply labels, means to supply containers, an exhaust head to receive labels and apply them to the containers, means to create exhaust within the head, means to move the head from label receiving to label delivering position, a gripper carried by the head and provided with means to engage labels to retain them on the head and release the labels, and means to actuate the gripper to engage the label after it has been attached to the head by the exhaust and to release the label before it is applied to the container.

2. A labeling machine comprising means to supply labels, means to supply containers, an exhaust head to receive labels and apply them to the containers, means to create exhaust within the head, means to move the head from label receiving to label delivering position, a gripper carried by the head and provided with means to engage labels to retain them on the head and release the labels, means to actuate the gripper, and means to apply adhesive to the labels while held by the gripper upon said head the gripper preventing the label from being rolled from the head when adhesive is applied to the label.

3. A labeling machine comprising means to supply labels, means to supply containers, an exhaust head to receive labels and apply them to the containers, means to create exhaust within the head, means to move the head from label receiving to label delivering position, a gripper movably carried by the head and provided with means to retain labels on the heads, a sleeve slidable relatively to the head, means operatively connecting the sleeve with the gripper, a spring cooperative with the sleeve to actuate the gripper, and spaced stops cooperative with the sleeve to move the gripper out of label engaging position.

4. A labeling machine comprising means to supply labels, means to supply containers, an exhaust head to receive the labels provided with air passages, a tube connected with the head, a pinion connected with the tube, a cap cooperative with the pinion and having an opening communicating with the tube, a hollow hood upon the cap, exhaust means connected with the hood, means to rotatively support the tube, means to actuate said supporting means, and means to operate the pinion during operation of said actuating means.

5. A labeling machine comprising means to supply labels, means to supply containers, an exhaust head to receive the labels provided with air passages, a tube connected with the head, a pinion connected with the tube, a cap cooperative with the pinion and having an opening communicating with the tube, a hollow hood upon the cap, exhaust means connected with the hood, a slidable member rotatively supporting the tube, a segmental gear pivotally supported upon the slidable member and in mesh with the pinion, said gear being provided with a projection, a member having a cam-like groove receiving said projection for operating the gear, and means to reciprocate said slidable member.

6. A labeling machine comprising means to supply labels, means to supply containers, an exhaust head for the labels provided with an air port and a passage, a tube connected with the head, a pinion upon the tube, a cap upon the pinion, a threaded rod clamping the cap, pinion, tube and head together, said cap having an opening communicating with the tube, a hood upon the cap provided with an air passage, exhaust means connected with said passage, means to move the head from label receiving to label delivering position, and means to operate the pinion to rotate the head from label receiving to label delivering position and vice versa.

7. A labeling machine comprising means to supply labels, means to supply containers, an exhaust head, means movably supporting the exhaust head to move it from label receiving to label delivering position, means to apply adhesive to the label between said last named positions, valve means connected with said exhaust head, exhaust means and air pressure producing means connected with the valve, said valve having means to place said exhaust means in communication with said head and to cut off such communication and place such air pressure means in communication with said head when the label has been applied against a container to smooth the label thereon, and means to operate the valve after the label has been applied against the container for forcing the label smoothly against the container.

8. A labeling machine comprising means to supply labels, means to supply containers, an exhaust head, means movably supporting the exhaust head to move it from label receiving to label delivering position, valve means connected with said exhaust head comprising a casing having an air port, an exhaust port, and a port for air under pressure, exhaust means connected with the exhaust port, means for producing air pressure connected with said pressure port, and a movable member within the casing provided with means to place the first and second named ports in and out of communication and to place the first and third named ports in and out of communication alternately.

9. A labeling machine comprising means to supply labels, means to supply containers, an exhaust head, means movably supporting the exhaust head to move it from label receiving to label delivering position, valve means connected with said exhaust head comprising a casing having an air port, an exhaust port, and a port for air under pressure, said casing having a channel communicating with the first named port and having a passage and a port communicating with the second named port, said casing also having an air relief port, a movable member in the casing provided with a channel adapted to communicate with the first and second named ports simultaneously and with the fourth and fifth named ports simultaneously, said member having a channel adapted to communicate with the first named channel and with said air pressure port simultaneously, and means to actuate said member.

10. A labeling machine comprising means to supply labels, means to supply containers, means to supply adhesive between the labels and the containers, means to apply the labels to the containers, a brush comprising relatively movable members, means to apply the brush upon and remove it from labels on the containers, and means to move the members of the brush in various directions simultaneously away from each other along the labels for spreading the same on the containers.

11. A labeling machine comprising means to supply labels, means to supply containers, means to supply adhesive between the labels and the containers, means to apply the labels to the containers, a brush comprising pairs of members pivotally supported to move toward and from one another, and means to move said members toward and from one another.

12. A labeling machine comprising means to supply labels, means to supply containers, means to supply adhesive between the labels and the containers, means to apply the labels to the containers, a brush comprising a head, pairs of members pivotally supported beneath said head, means upon said head cooperative with said members to move said members toward and from one another, and means to actuate said last named means.

13. A labeling machine comprising means to supply labels, means to supply containers, means to supply adhesive between the labels and the containers, means to apply the labels to the containers, a brush comprising a head, pairs of members pivotally carried by the head, the adjacent ends of opposing members of said pairs being movably connected together, a rotative member operatively connected with said brush members, and means to operate said rotative member to cause the members of each pair to move toward and from one another.

PETER MEYER.